(12) United States Patent
Moreau

(10) Patent No.: US 7,503,664 B2
(45) Date of Patent: Mar. 17, 2009

(54) FLAME RETARDANT RETROREFLECTIVE FILM STRUCTURE

(75) Inventor: Leo Moreau, Broad Brook, CT (US)

(73) Assignee: Reflexite Corporation, Avon, CT (US)

( * ) Notice: Subject to any disclaimer, the term of this patent is extended or adjusted under 35 U.S.C. 154(b) by 120 days.

(21) Appl. No.: 11/716,400

(22) Filed: Mar. 9, 2007

(65) Prior Publication Data

US 2007/0223092 A1 Sep. 27, 2007

Related U.S. Application Data

(60) Provisional application No. 60/782,347, filed on Mar. 15, 2006.

(51) Int. Cl.
*G02B 5/124* (2006.01)
*B32B 3/28* (2006.01)

(52) U.S. Cl. .................. 359/530; 359/529; 428/167; 428/424.6; 428/518; 428/920; 428/921

(58) Field of Classification Search .................. None
See application file for complete search history.

(56) References Cited

U.S. PATENT DOCUMENTS

| 4,533,592 | A | 8/1985 | Bingham |
| 4,921,756 | A | 5/1990 | Tolbert et al. |
| 5,110,655 | A | 5/1992 | Engler et al. |
| 5,540,980 | A | 7/1996 | Tolbert et al. |
| 5,648,145 | A | 7/1997 | Martin |
| 5,888,618 | A | 3/1999 | Martin |
| 6,009,560 | A | 1/2000 | McKenney et al. |
| 6,146,759 | A | 11/2000 | Land |
| 6,153,128 | A | 11/2000 | Lightle et al. |
| 6,159,878 | A | 12/2000 | Marsh |
| 6,287,690 | B1 | 9/2001 | Land |
| 6,361,850 | B1 | 3/2002 | Billingsley et al. |
| 6,410,140 | B1 | 6/2002 | Land et al. |
| 6,553,749 | B2 | 4/2003 | Land et al. |
| 6,569,786 | B1 | 5/2003 | Marsh |
| 6,606,846 | B2 | 8/2003 | Land |
| 2006/0052021 | A1 | 3/2006 | Aneja et al. |
| 2006/0135023 | A1 | 6/2006 | Knoff |

*Primary Examiner*—James Phan
(74) *Attorney, Agent, or Firm*—Hamilton, Brook, Smith & Reynolds, P.C.

(57) ABSTRACT

Flame retardant and heat resistant retroreflective structures are disclosed. Generally, the retroreflective structure includes a transparent plasticized polyvinyl chloride film, an array of retroreflective cube-corner elements underlying the transparent plasticized polyvinyl chloride film, a flame retardant and heat resistant adhesive underlying the array of retroreflective cube-corner elements, and a flame retardant woven fabric bonded to the flame retardant and heat resistant adhesive.

39 Claims, 1 Drawing Sheet

FLAME RETARDANT RETROREFLECTIVE FILM STRUCTURE

RELATED APPLICATION

This application claims the benefit of U.S. Provisional Patent Application No. 60/782,347, filed on Mar. 15, 2006, the entire teachings of which are incorporated herein by reference.

BACKGROUND OF THE INVENTION

Retroreflective materials are employed for various safety and decorative purposes. Particularly, these materials are useful at nighttime when visibility is important under low light conditions. With perfect retroreflective materials, light rays are reflected essentially towards a light source in a substantially parallel path along an axis of retroreflectivity. Retroreflective materials can be used as reflective tapes and patches for clothing, such as vests and belts. Also, retroreflective materials can be used on posts, barrels, traffic cone collars, highway signs, vehicles, warning reflectors, etc. Retroreflective material can include arrays of randomly oriented micron diameter spheres or close packed cube-corner (prismatic) arrays.

Cube-corner or prismatic retroreflectors are described, for example, in U.S. Pat. No. 3,712,706, issued to Stamm on Jan. 23, 1973, the teachings of which are incorporated by reference herein. Generally, the prisms can be made by forming a master negative die on a flat surface of a metal plate or other suitable material. To form grooves 60 degrees apart are inscribed in the flat plate. The die is then used to process the desired cube-corner array into a rigid flat plastic surface.

Further details concerning the structures and operation of cube-corner microprisms can be found in U.S. Pat. No. 3,684,348, issued to Rowland on Aug. 15, 1972, the teachings of which are incorporated by reference herein. A method for making retroreflective sheeting is also disclosed in U.S. Pat. No. 3,689,346 issued to Rowland on Sep. 5, 1972, the teachings of which are incorporated by reference herein. For example, cube-corner microprisms can be formed in a cooperatively configured mold. The prisms can be bonded to sheeting, which is applied thereover to provide a composite structure in which the cube-corner elements project from one surface of the sheeting.

Retroreflective materials can be particularly useful when visibility is critical such as under emergency conditions. For example, retroreflective materials can be used for firefighters' coats and protective clothing. However, the conditions that firefighters are exposed to can be harsh, especially in regard to excessive heat and temperature conditions. Many retroreflective materials are made of plastics that soften at temperatures of about 100° C. The softened plastic in such materials can begin to flow causing the material to lose its retroreflectivity and thereby impair visibility. The National Fire Protection Association (NFPA) has established standards that can be used to evaluate clothing and retroreflective structures intended to be worn by firefighters.

SUMMARY OF THE INVENTION

The present invention is directed to flame retardant and heat resistant retroreflective structures. In one embodiment, the retroreflective structure includes a transparent plasticized polyvinyl chloride film, an array of retroreflective cube-corner elements underlying the transparent plasticized polyvinyl chloride film, a flame retardant and heat resistant adhesive underlying the array of retroreflective cube-corner elements; and a flame retardant woven fabric bonded to the flame retardant and heat resistant adhesive.

In other embodiments, retroreflective structures include a transparent plasticized polyvinyl chloride film; an array of retroreflective cube-corner elements underlying the transparent plasticized polyvinyl chloride film, a metallized reflective layer deposited on the retroreflective cube-corner elements, a flame retardant and heat resistant crosslinked acrylic adhesive bonded to the metallized reflective layer, and a flame retardant woven fabric bonded to the acrylic adhesive.

The retroreflective structures described herein can meet or exceed standards set by the NFPA for application to firefighters' clothing. Advantageously, retroreflective structures of the present invention can include a plasticized polyvinyl chloride film that does not need to contain fire retardant additives in order to meet NFPA standards. Consequently, conventional, off-the-shelf plasticized polyvinvyl chloride films can be used to make the retroreflective structures. Further, the retroreflective structures can include an array of cube-corner elements that also does not need to contain fire retardant additives in order to meet NFPA standards for the retroreflective structures. In addition, in some embodiments, the retroreflective structures can meet NFPA standards without having additional layers, e.g., overlying the plasticized polyvinyl chloride film, which contain fire retardant additives.

The flame retardant feature of the present invention allows the product to be utilized for applications where flame resistance is required or desirable.

In some embodiments, the heat resistant feature of the present invention prevents melting or dripping, for example, at temperatures up to about 260° C. for about 5 minutes. In addition, the retroreflective structures of the present invention can be heated to about 140° C. for about 10 minutes while maintaining at least about 100 SIA retroreflectivity.

The present invention can be used on firefighter's turnout gear to improve conspicuousness, for example, during wet conditions or at dawn, dusk, and nighttime. In particular, the invention can be slit into tapes whereby the tapes are sewn to the firefighter's turnout gear. In addition, the product can be used for other applications whereby conspicuousness, heat resistance, and flame retardancy are desired or necessary.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Generally, the retroreflective structures of the present invention include a transparent plasticized polyvinyl chloride film, an array of retroreflective cube-corner elements underlying the transparent plasticized polyvinyl chloride film, a flame retardant and heat resistant adhesive underlying the array of retroreflective cube-corner elements; and a flame retardant woven fabric bonded to the flame retardant and heat resistant adhesive.

Figure 1:
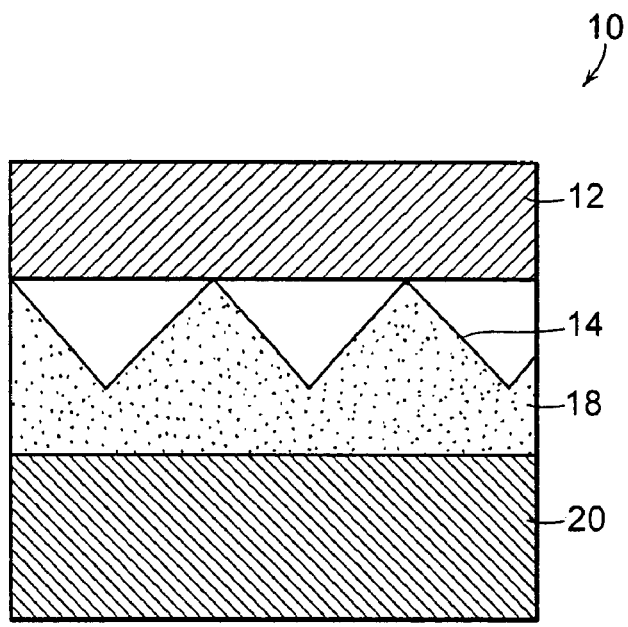
FIG. 1 is a cross sectional view of a retroreflective structure formed according to one embodiment of the present invention.
Figure 2:
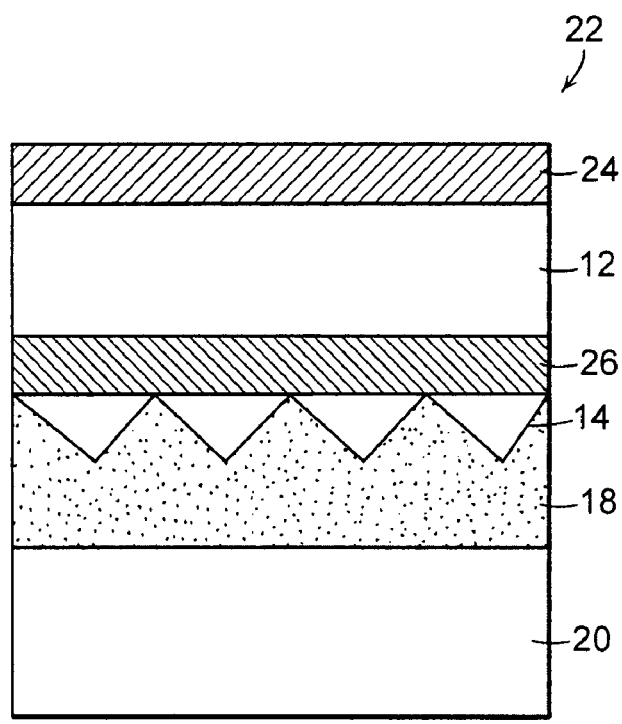
FIG. 2 is a cross sectional view of a retroreflective structure, containing optional transparent coatings, according to another embodiment of the present invention.

FIGS. 1 and 2 illustrate embodiments of the present invention. Retroreflective structures 10 and 22 include transparent plasticized polyvinyl chloride film 12. Suitable transparent plasticized vinyl films can be manufactured, for example, by calendaring, extrusion, solvent casting, or other methods known in the art. Polyvinyl chloride film 12 can contain various colorants and performance additives well-known to those of skill in the art. In a preferred embodiment, the film is a calendered film. Calendaring can be an especially useful method due to the flexibility of the calendaring process to compound colorants and performance enhancement additives.

Polyvinyl chloride film 12 is substantially transparent. In some embodiments, Polyvinyl chloride film 12 is substantially transparent to visible light. Polyvinyl chloride film 12 can be either clear or transparently colored. In some embodiments, the polyvinyl chloride film includes a fluorescent dye. Retroreflective structures of the present invention can include a plasticized polyvinyl chloride film that does not need to contain fire retardant additives in order to meet NFPA standards. Consequently, in some embodiments, the plasticized polyvinyl chloride film is essentially free of fire retardant additives.

Polyvinyl chloride film 12 can have a thickness, for example, of about 0.001 to about 0.022 inches (about 0.025 mm to about 0.56 mm) such as about 0.004 to about 0.020 inches (about 0.1 millimeters (mm) to about 0.51 mm), about 0.004 to about 0.01 inches (about 0.1 mm to about 0.25 mm), about 0.006 to about 0.01 inches (about 0.15 mm to about 0.25 mm), or about 0.006 to about 0.018 inches (about 0.15 mm to about 0.46 mm). The thickness of the base film can be selected based on the flexibility, tear resistance, and color stability desired for any particular application. Furthermore, the selected film thickness of the structure can be selected based on the desired long-term weatherability characteristics of the structure. In general, thinner layers of polyvinyl chloride films are preferred to further limit flammability of the retroreflective structure. For example, in preferred embodiments, the polyvinyl chloride film has a thickness about 0.004 to about 0.01 inches (about 0.1 mm to about 0.25 mm).

The transparent plasticized polyvinyl chloride film has a Shore A hardness, for example, of about 25 to about 60 such as about 30 to about 50, about 30 to about 45, or about 35 to about 40. In one particular embodiment, the transparent plasticized polyvinyl chloride film has a Shore A hardness of about 36. Shore A hardness is a measure of the relative hardness of a material and can be determined with an instrument called a Shore A durometer.

Examples of suitable polyvinyl chloride film include a polyvinyl chloride film available from American Renolit Corporation under the trademark RENOLIT® (Whippany, N.J.), or a calendered plasticized polyvinyl chloride film available from Achilles USA, Everett, Wash.

In addition to polyvinyl chloride film 12, the retroreflective structures also include an array of retroreflective cube-corner elements. Generally, the retroreflective structure includes array of retroreflective cube-corner elements 14 underlying transparent plasticized polyvinyl chloride film 12. "Underlying" refers to the relative orientation of the retroreflective cube-corner elements to the transparent plasticized polyvinyl chloride film.

The polyvinyl chloride film can provide a substrate for an array of retroreflective cube-corner elements. In one embodiment, the array of retroreflective cube-corner elements is attached to the polyvinyl chloride film. Generally, the array of retroreflective cube-corner elements has a window side exposed to incoming light rays and an opposite, facet side. The array of retroreflective cube-corner elements can be oriented such that the window side faces the polyvinyl chloride film. For example, window side of the array of retroreflective cube-corner elements can be attached to the polyvinyl chloride film. In some embodiments, the array of retroreflective cube-corner elements is attached to the polyvinyl chloride film using a transparent adhesive. Alternatively, the array of retroreflective cube-corner elements can be attached to the polyvinyl chloride film using a transparent coating, described further infra, such as a transparent coating formed from a radiation-curable or solvent or water based coating formulation. In one embodiment, the array of retroreflective cube-corner elements can be cast directly onto the polyvinyl chloride film.

Array of retroreflective cube-corner elements 14 can be formed of a polymer, e.g., a substantially transparent polymer. After being formed into the array of retroreflective cube-corner elements, the polymer is preferably rigid, or substantially inflexible, at room temperature. The rigidity of the polymer in the array allows the cube-corner elements to maintain their optical characteristics. The polymer can also be non-extensible, which is defined as not being capable of being substantially stretched without breaking. The polymer can be selected from a wide variety of polymers which include, but are not limited to, urethane, acrylic acid esters, cellulose esters, ethylenically unsaturated nitrites, hard epoxy acrylates, etc. Other polymers include polycarbonates, polyesters and polyolefins, acrylate silanes, hard polyester urethane acrylates. Other polymers, which are not as rigid, can also be used. These polymers include polyvinyl chloride and polyvinylidene chloride. Preferably, the polymer is cast in a prismatic mold with a monomer or oligomer. The polymerization of the monomer or oligomer can be initiated by radiation, e.g., ultraviolet radiation. Retroreflective structures of the present invention can include an array of retroreflective cube-corner elements that does not need to contain fire retardant additives in order to meet NFPA standards for the retroreflective structure. Consequently, in some embodiments, the array of cube-corner elements is essentially free of fire retardant additives.

In some embodiments, the polyvinyl chloride film and array of retroreflective cube-corner elements can be formed by methods such as those disclosed in U.S. Pat. No. 3,684,348, issued to Rowland on Aug. 15, 1972; U.S. Pat. No. 3,689,346, issued to Rowland on Sep. 5, 1972; U.S. Pat. No. 3,811,983, issued to Rowland on May 21, 1974; U.S. Pat. No. 3,830,682, issued to Rowland on Aug. 20, 1974; U.S. Pat. No. 3,975,083, issued to Rowland on Aug. 17, 1976; U.S. Pat. No. 4,332,847, issued to Rowland on Jun. 1, 1982; U.S. Pat. No. 4,801,193, issued to Martin on Jan. 31, 1989; U.S. Pat. No. 5,229,882, issued to Rowland on Jul. 20, 1993; U.S. Pat. No. 5,236,751, issued to Martin, et al. on Aug. 17, 1993; U.S. Pat. No. 5,264,063, issued to Martin on Nov. 23, 1992; U.S. Pat. No. 5,376,431, issued to Rowland on Dec. 27, 1994; U.S. Pat. No. 5,491,586, issued to Phillips on Feb. 13, 1996; U.S. Pat. No. 5,512,219, issued to Rowland on Apr. 30, 1996; U.S. Pat. No. 5,558,740, issued to Bernard, et al. on Sep. 24, 1996; U.S. Pat. No. 5,592,330, issued to Bernard on Jan. 7, 1997; and U.S. Pat. No. 5,637,173, issued to Martin, et al. on Jun. 10, 1997. The entire contents of each patent are incorporated herein by reference.

The cube-corner elements of the array can have a length along each cube-side edge, for example, in the range of about 0.0015 to about 0.02 inches (about 0.038 to about 0.51 mm). Preferably, each cube-side edge has a length of about 0.003 to about 0.008 inches (about 0.076 to about 0.2 mm) such as about 0.0035 to about 0.006 inches (about 0.089 to about 0.15 mm). In one embodiment, each cube-side edge has a length of about 0.0035 inches (about 0.089 mm). In general, retroreflective structures containing relatively small cube-corner elements are preferred. Without being held to any particular theory, retroreflective structures containing relatively small cube-corner elements are generally less flammable than retroreflective structures containing larger cube-corner elements.

The thickness of the array in the valleys where the cube-corner elements intersect is preferably sufficiently thin so that the array can crack and split along the valleys when minimal force is applied to the retroreflective structure. In some embodiments, the thickness of the array, which is the distance from the window side to apex of the cube-corner elements, is about 0.001 to about 0.009 inches (about 0.025 to about 0.23 mm) such as about 0.001 to about 0.005 inches (about 0.025 to about 0.13 mm), about 0.001 to about 0.003 inches (about 0.025 to about 0.076 mm), or about 0.0015 to about 0.003 inches (about 0.038 to about 0.076 mm). In one specific embodiment, the thickness of the array is about 0.0017 inches (about 0.043 mm).

In addition to the polyvinyl chloride film and the array of retroreflective cube-corner elements, the retroreflective structures also include a flame retardant and heat resistant adhesive. Generally, the retroreflective structure includes flame retardant and heat resistant adhesive 18 underlying array of cube-corner elements 14. "Underlying" refers to the relative orientation of the retroreflective adhesive to the array of cube-corner elements.

Flame retardant and heat resistant adhesive 18 can be applied to prism facets of the cube-corner elements for adhesion to fabric 20. If an adhesive is applied directly to the prism facets, however, the adhesive can cause the surface of the prisms to wet, thereby destroying the air interface and reducing, or even eliminating, the ability of the prisms to retroreflect. As a result, a reflective coating is preferably first deposited on the surface of the dihedral facets. Examples of suitable materials for forming a reflective coating include, but are not limited to, aluminum, silver, gold, palladium, and combinations thereof. Typically, the reflective coatings are formed by sputtering or by vacuum deposition. For example, the cube-corner elements can be vapor deposited with aluminum to create a reflective metal layer. In one embodiment, aluminum is vapor deposited whereby aluminum is heated under a vacuum and aluminum vapor is condensed onto the cube-corner elements to form a aluminum layer, e.g., a continuous aluminum layer. Alternatively, metal lacquers, dielectric coatings and other specular coating materials can be employed to form a reflective coating on the cube-corner elements. The thickness of the aluminum layer can be in the range of about 200 to about 600 Angstroms, for example, about 200 to about 500 or about 200 to about 400 Angstroms. In one embodiment, adhesive is applied directly to a metallized surface of the array of cube-corner elements.

Adhesive 18 can be selected based on its ability to adhesively bond to both the fabric and to the array of cube-corner elements, e.g., an array of metallized cube-corner elements. In addition, the adhesive should provide enough adhesive strength such that the array of cube-corner elements does not separate from the polyvinyl chloride film or from the fabric after laundering or usage. Additionally, the adhesive should provide flame retardancy as well as heat resistance to the retroreflective structure. Heat resistance can be defined as not melting, dripping, igniting, or separating after the sample is placed in a 260° C. oven for 5 minutes as specified by the National Fire Protection Association (NFPA) EN471 specification. Flame retardancy can be defined as having less than 2 seconds of afterflame after the sample has been vertically burned in accordance with the NFPA EN471 specification.

Adhesive 18 can include silicone adhesives and acrylic adhesives such as acrylic-based pressure sensitive adhesives or silicone pressure sensitive adhesives. In one preferred embodiment, the adhesive is an acrylic-based adhesive due to its wide availability and relatively low cost. In general, acrylic adhesives have excellent UV resistance, excellent resistance to non-polar solvents and therefore make an excellent choice for this application. However, not all acrylic adhesives exhibit high temperature resistance. An example of a well-known method to increase the heat resistance is to crosslink the adhesive. Crosslinking the adhesive can reduce the mobility of the acrylic molecules and therefore can provide excellent heat resistance to the retroreflective structure by reducing, or preventing, melting and/or dripping at high temperatures. In a preferred embodiment, the adhesive is a crosslinked acrylic pressure sensitive adhesive. A two-stage crosslinking system is generally preferred. In this embodiment, a first crosslinking stage allows partial crosslinking while still maintaining important adhesive properties such as, for example, tack. This usually occurs at drying temperatures during coating of a solvent-based adhesive. The second crosslinking stage can occur at higher temperature to allow the adhesive to crosslink in application such that the adhesive does not melt or drip during high temperature exposure. In some embodiments, the second crosslinking stage includes a melamine or epoxy system.

The thickness of the adhesive can be about 0.001 inches (about 0.025 mm) to about 0.008 inches (about 0.2 mm) such as about 0.002 inches (0.051 mm) to about 0.006 inches (about 0.15 mm), about 0.002 inches (0.051 mm) to about 0.0045 inches (0.11 mm), about 0.003 inches (about 0.076 mm) to about 0.004 inches (about 0.1 mm), or about 0.0035 inches (about 0.089 mm).

Acrylic adhesives can be flammable. Thus, it can be necessary to introduce flame retardant additives into the adhesive. The most effective flame retardant systems include halogen-based additives such as brominated or chlorinated additives. In one embodiment, the flame retardant and heat resistant adhesive contains at least one additive selected from the group consisting of flame retardant chlorinated additives, flame retardant brominated additives, and combinations thereof. Synergists such as antimony trioxide, antimony pentoxide, sodium antimonite, zinc borate and combinations thereof can be used to improve the flame retardancy of the adhesive. Thus, in some embodiments, the flame retardant and heat resistant adhesive contains at least one flame retardant synergist selected from the group consisting of antimony trioxide, antimony pentoxide, sodium antimonite, zinc borate, and combinations thereof. Other flame retardant systems such as phosphorous-based additives, boron based additives, aluminum trihydroxide, nitrogen-based additives and combinations thereof can also be included in the adhesive. A preferred flame retardant system is a halogenated flame retardant coupled with an antimony trioxide synergist.

Flame retardant and heat resistant adhesives can be obtained from a variety of sources. One example of a suitable acrylic adhesive was obtained from Syntac Coated Products, LLC (Bloomfield, Conn.). This acrylic adhesive is a two-stage crosslinked acrylic adhesive. The first stage crosslinks during coating of the adhesive when the solvent is evaporated to leave a solid coating. The second stage crosslinking occurs between about 200 and about 250° F. (between about 93 and about 121° C.). This particular adhesive uses an epoxy secondary crosslinking system.

In another embodiment, a nitrile rubber/phenolic blend adhesive can be used such as a nitrile rubber/phenolic blend adhesive which crosslinks at a high temperature. One example of a nitrile rubber/phenolic blend adhesive is H206U available from Scapa North America (Windsor, Conn.). Nitrile rubber/phenolic blend adhesives can also include flame retardant additives such as described supra.

In one aspect, the present invention includes a transparent plasticized polyvinyl chloride film, an array of retroreflective cube-corner elements underlying the transparent plasticized polyvinyl chloride film, a polymeric film layer sealed through the array of cube-corner elements to the transparent plasticized polyvinyl chloride film, a flame retardant and heat resistant adhesive underlying the array of retroreflective cube-corner elements, and a flame retardant woven fabric bonded to the flame retardant and heat resistant adhesive. In one embodiment, the flame retardant and heat resistant adhesive is bonded to the polymeric film layer and also to the flame retardant woven fabric. The polymeric film layer can be, for example, a plasticized polyvinyl chloride film. The composition of such a polymeric film layer can be similar to transparent plasticized polyvinyl chloride film 12 described supra. Polymeric film layer, however, can be transparent or opaque. Polymeric film layer can be sealed through the array of cube-corner elements to the transparent plasticized polyvinyl chloride film through techniques such as, for example, radio frequency or ultrasonic sealing or welding. In some embodiments, such a polymeric film layer can eliminate any need for metallization of the cube-corner elements.

The retroreflective structures of the present invention also include a flame retardant woven fabric bonded to the flame retardant and heat resistant adhesive. Many flame retardant woven fabrics are suitable. Flame retardant woven fabric 20 can include, for example, glass fiber fabric, modacrylic fabrics, modacrylic fabric, Nomex fabric, Nomex and Kevlar blends, polybenzimidizole fabric, woven corespun composite yarn with a glass fiber core and a sheath of cotton and flame retardant modacrylic fiber. In some embodiments, the flame retardant woven fabric is selected from the group consisting of fiber glass fabrics, flame retardant modacrylic fabrics, Nomex fabrics, Nomex-Kevlar fabrics, polybenzimidizole fabrics, fabrics which include a corespun composite yarn with a glass fiber core and a sheath of cotton and flame retardant modacrylic fiber, and combinations thereof. In one preferred embodiment, the fabric is composed of a corespun composite yarn with a glass fiber core and a sheath of cotton and flame retardant modacrylic fiber surrounding and covering the core in both the warp and fill directions of the fabric.

The fabric can include glass fiber and flame retardant modacrylic fiber. For example, the woven fabric can include about 20 to about 90 weight percent glass fiber such as about 25 to about 80, about 30 to about 70, about 30 to about 60, or about 35 to about 45 weight percent glass fiber. The woven fabric can include, for example, about 5 to about 80 weight percent modacrylic fiber such as about 10 to about 70, about 15 to about 50, or about 20 to about 30 weight percent modacrylic fiber. The fabric can also include blends of cotton fiber. In some embodiments, the woven fabric includes no more than about 60 weight percent cotton fiber such as, for example, no more than about 50, about 40, or about 30 weight percent cotton fiber. For example, the fabric can about 10 to about 50 weight percent cotton fiber such as about 20 to about 40 or about 30 to about 40 weight percent cotton fiber. In specific embodiments, the woven fabric includes about 35 to about 45 weight percent glass fiber, about 30 to about 40 weight percent cotton fiber, and about 20 to about 30 weight percent modacrylic fiber. For example, the woven fabric can include about 40% glass fiber, about 35% cotton, and about 25% modacrylic fiber (all by weight). In other embodiments, the woven fabric includes about 35 to about 45 weight percent glass fiber and about 55 to about 65 weight percent modacrylic fiber. For example, the woven fabric can include about 41 weight percent glass fiber and about 59 weight percent modacrylic fiber.

Modacrylic fiber is an acrylic synthetic fiber made from a polymer comprising primarily acrylonitrile. Modacrylics are generally made from copolymers of polyacrylonitrile and other polymers such as vinyl chloride, vinylidene chloride, vinyl bromide, or vinylidene bromide. An example of modacrylic fiber suitable for use in the present invention is available commercially under the trademark PROTEX® C from Kaneka America Corporation (New York, N.Y.).

The fabric utilized in the present invention can provide flame retardancy; tear resistance, heat resistance, and dimensional stability to the retroreflective structure. The weight of the fabric can be, for example, about 1 to about 15 ounces/square yard (oz/yd$^2$) (about 34 to about 510 grams/square meter (g/m$^2$)) such as about 2 to about 10 oz/yd$^2$ (about 68 to about 340 g/m$^2$), about 3 to about 8 oz/yd$^2$ (about 100 to about 270 g/m$^2$), or about 3 to about 6 oz/yd$^2$ (about 100 to about 200 g/m$^2$). In one embodiment, the fabric has an relatively open weave to allow the adhesive to penetrate into the fabric for desired adhesion to the fabric. For example, the woven fabric can have a weave density of about 40 to about 70 (Warp) by about 25 to about 45 (Fill) threads per inch (per 25.4 mm) such as the woven fabric has a weave density of about 55 to about 65 (Warp) by about 30 to about 40 (Fill) threads per inch (per 25.4 mm). In some embodiments, the fabric has a weave density of less than about 60 (Warp) by about 35 (Fill) threads per inch (per 25.4 mm).

An example of a suitable woven fabric is 5.7 oz/yd$^2$ (about 190 g/m$^2$) core spun composite fabric having a glass fiber core with a sheath of cotton and flame retardant modacrylic and containing about 40 weight percent glass fiber, about 35 weight percent cotton, and about 25 weight percent modacrylic fiber, and having a weave density of about 60 (Warp) by about 35 (Fill) threads per inch (per 25.4 mm). Such a fabric is available from Spring Industries, Inc. (Fort Mill, S.C.) under the FIREGARD® trademark. Another example of a suitable woven fabric includes about 41 weight percent glass fiber and about 59 weight percent flame retardant modacrylic fiber with a weave density of about 44 (Warp) by about 34 (Fill) threads per inch (per 25.4 mm). Such a fabric is also available from Spring Industries, Inc. (Style No. 4-7091-114) under the FIREGARD® trademark.

Examples of fabrics suitable for use in the present invention include those described in U.S. Pat. No. 4,921,756 issued to Tolbert, et al. on May 1, 1990; U.S. Pat. No. 6,146,759 issued to Land on Nov. 14, 2000; U.S. Pat. No. 6,287,690 issued to Land on Sep. 11, 2001; U.S. Pat. No. 6,410,140 issued to Land, et al. on Jun. 25, 2002; U.S. Pat. No. 6,553,749 issued to Land, et al. on Apr. 29, 2003; U.S. Pat. No. 6,606,846 issued to Land on Aug. 19, 2003; and U.S. Pat. No. 5,540,980 issued to Tolbert, et al. on Jul. 30, 1996., the entire contents of each of which is incorporated herein by reference. For example, U.S. Pat. No. 4,921,756 describes a fire resistant nonlively corespun yarn for use in forming fire resistant fabrics and lightweight substrates for coated fabrics, the nonlively corespun yarn comprising an air jet spun unplied yarn without any appreciable S or Z twist and having a core of high temperature resistant continuous filament fiberglass, and a sheath of low temperature resistant staple fibers surrounding and covering the core.

It can be important that the fabric be free of any coatings such as, for example, sizing agents that can affect the bond of the adhesive to the fabric. Common sizing agents include starch based and synthetic polymers such as polyacrylic acid ester, polyvinyl alcohol, and acrylic. Typically, sizing agents are required to protect warp yarns against abrasion during weaving. However, sizing agents can be removed through a de-sizing operation to maximize the adhesion of the adhesive to the fabric. Thus, in some embodiments, the woven fabric is essentially de-sized of any sizing agents such as sizing agents that may have been utilized during weaving. For example, the woven fabric can be essentially free of starch-based and synthetic polymers such as polyacrylic acid ester, polyvinyl alcohol, and acrylic.

In one aspect, retroreflective structures of the present invention include a transparent plasticized polyvinyl chloride film; an array of retroreflective cube-corner elements underlying the transparent plasticized polyvinyl chloride film; a metallized reflective layer deposited on the retroreflective cube-corner elements; a flame retardant and heat resistant crosslinked acrylic adhesive bonded to the metallized reflective layer; and a flame retardant woven fabric bonded to the acrylic adhesive. Suitable transparent plasticized polyvinyl chloride films, metallized reflective layers, flame retardant and heat resistant crosslinked acrylic adhesives, and flame retardant woven fabric are described supra.

In some embodiments, one or more optional transparent coatings, for example, transparent coatings 24 and 26, are applied adjacent to polyvinyl chloride film 12. For example, retroreflective structure 22 can include transparent coatings on both sides of polyvinyl chloride film 12. Alternatively, the retroreflective structure can include a transparent coating on only one side of the polyvinyl chloride film. In one embodiment, the array of retroreflective cube-corner elements can be formed on the surface of transparent coating 26.

Preferably, coating formulations for transparent coatings are selected such that the resulting coatings are flexible, provide a strong bond to the plasticized polyvinyl chloride film, and provide a strong bond to any optional printed ink layers (described infra). For instances in which the retroreflective structure includes two or more transparent coatings, the transparent coatings can have the same or different compositions. Transparent coatings can be applied by applying various coating formulations over the polyvinyl chloride film. For example, the coating formulation can be a radiation curable formulation, a solvent based coating formulation, or a water based coating formulation.

In one embodiment, the base chemical for a transparent coating is a urethane acrylate prepolymer. Suitable coating formulations can include, for example, one or more of the following prepolymers: aliphatic urethane acrylates, aliphatic urethane methacrylates, aromatic urethane acrylates, aromatic urethane methacrylates, imide/ester/amide urethane acrylates, phenoxy urethane acrylates, phenoxy urethane methacrylates, polyester acrylates, polyester methacrylates, chlorinated polyester acrylates, chlorinated polyester methacrylates, dendritic polyester acrylates, dendritic polyester methacrylates, epoxy acrylates, epoxy methacrylates, polybutadiene acrylates, and polybutadiene methacrylates. In a preferred embodiment, the base chemical for the coating is an aliphatic urethane acrylate prepolymer. Generally, the molecular weight of the prepolymer is desired to be greater than 500 grams/mol, however, in some embodiments, the molecular weight of the prepolymer can be less than 500 grams/mol. In a preferred embodiment, the molecular weight of the prepolymer is between 500 and 3000 grams/mol. In some embodiments, the prepolymer has an acrylate moiety functionality, for example, of between 1 and 6 such as between 1.2 and 3.

The transparent coating formulations also can contain other prepolymers for such functions as viscosity modification, adhesion promotion, tack reduction, and other purposes. Examples of monofunctional prepolymers that can be used for viscosity modification include but are not limited to isobornyl acrylate, 2(2-ethoxyethoxy) ethyl acrylate, tridecyl acrylate, octyldecyl acrylate, 2-phenoxyethyl acrylate, 2-phenoxyethyl methacrylate, alkoxylated lauryl acrylate, lauryl acrylate, lauryl methacrylate, isodecyl acrylate, stearyl acrylate, and stearyl methacrylate. Examples of multifunctional prepolymers that can be used for viscosity modification include, but are not limited to, trimethylolpropane triacrylate, trimethylolpropane trimethacrylate, ethoxylated trimethylolpropane trimethacrylate, propoxylated trimethylolpropane triacrylate, and propoxylated glyceryl triacrylate. Additional prepolymers that can be used for additional functional benefits include, but are not limited to, epoxy acrylates, brominated epoxy acrylates, polyester acrylates, silicone acrylates, fluoroacrylates and polybutadiene acrylates.

In some embodiments, the transparent coatings are radiation curable. In general, a photoinitiator is needed to cure such a coating formulation. Examples of photoinitiators that can be used include, but are not limited to, benzyldimethylketal, 2-hydroxy-2-methyl-1-phenyl-1-propanone, alpha-hydroxy-cylohexylphenyl ketone, benzophenone, 2,4,6-trimethylbenzoylphenyl phosphineoxide, isopropylthioxanthone, ethyl-4-dimethylammino benzoate, 2-ethyl-4-dimethyl amino benzoate, oligo [2-hydroxy-2-methyl-1-[4-(1-methylvinyl) phenyl]propanone], difunctional alpha-hydroxy ketone, 1-[4-94-benzoylphenylsulfanyl) phenyl]-2-methyl-2-(4-methylphenylsulfonyl) propan-1-one, 2-methyl-1[4-(methylthio)phenyl]-2-morpholinopropane-1-one, phenylbis(2,4,6-trimethylbenzoyl)-phosphine oxide), 2,2-dimethoxy-1,2-diphenylethan-1-one, and combinations thereof.

Since many of the above-mentioned acrylate prepolymers can be flammable, in some instances thin transparent coatings are used. In some embodiments, the retroreflective structure includes one or more transparent coatings with a thickness of about 0.0001 inch (about 0.0025 mm) to about 0.0008 inch (about 0.02 mm), such as about 0.0001 inch (about 0.0025 mm) to about 0.0005 inch (about 0.013 mm), about 0.0001 inch (about 0.0025 mm) to about 0.0003 inch (about 0.0076 mm), or about 0.0002 inch (about 0.0051 mm). In addition, or alternatively, flame retardant additives may be included in the transparent coating. Flame retardant additives and methods for incorporating them into coatings are within the knowledge of those skilled in the art.

In some instances, the retroreflective structure can also include a printing ink, such as an opaque white printing ink. A printing ink can be included in the retroreflective structures, for example, to help achieve appropriate Cap Y to meet industry whiteness specifications. Printing ink can be applied, for example, between the polyvinyl chloride film 12 and a transparent coating. Alternatively, printing ink can be applied between a transparent coating and the array of retroreflective cube-corner elements. For example, printing ink can be applied between transparent coating 24 and retroreflective cube-corner element array 14. Printing ink can enhance Cap Y performance, however, it also can reduce the retroreflectivity of the prisms it covers. Therefore, the printing ink is often non-continuous. The printing ink can take various forms. For example, the printing ink can be in the form of a pattern, logo, lettering, etc. In some embodiments, the printing ink has been applied using a screen printing method.

In some embodiments, a retroreflective structure includes a transparent plasticized polyvinyl chloride film having a first side and a second side, a transparent radiation cured coating attached to the first side of the transparent plasticized polyvinyl chloride film, a non-continuous white opaque printed layer formed on the first side of the transparent plasticized polyvinyl chloride film, an array of retroreflective cube corner elements attached to the white opaque printed layer, a metallized reflective layer formed on the retroreflective cube corner elements, a flame retardant high temperature adhesive laminated to the metallized reflective layer, and a flame retardant woven fabric laminated to the flame retardant high temperature adhesive.

A method for manufacturing a retroreflective structure includes attaching a transparent plasticized polyvinyl chloride film to an array of retroreflective cube-corner elements and attaching a flame retardant woven fabric to the array of retroreflective cube-corner elements using a flame retardant and heat resistant adhesive. In some embodiments, a metallized reflective layer is deposited on the retroreflective cube-corner elements prior to attaching the flame retardant woven fabric to the array of retroreflective cube-corner elements using the flame retardant and heat resistant adhesive.

In another method for manufacturing a retroreflective structure, a transparent coating layer (e.g., a radiation cured transparent coating) is applied to a first side of a transparent plasticized polyvinyl chloride film. A non-continuous white opaque printing ink is attached to the transparent coating layer. An array of retroreflective elements is then attached to the white opaque printing ink. A metallized reflective layer is applied to an array of retroreflective cube-corner elements, thereby forming metallized retroreflective cube-corner elements. Lastly, a flame retardant heat resistant adhesive is coated to a flame retardant woven fabric and laminated to the metallized retroreflective cube-corner elements.

The retroreflective structures of the present invention can be attached to a suitable article of clothing such as a firefighter's overcoat, or other structure such as a fire helmet or air tank, by techniques known in the art. For instance, a retroreflective structure can be attached by an adhesive such as a plasticizer-resistant, pressure-sensitive or heat-activated adhesive. Alternatively, retroreflective structures can be sewn onto clothing.

EXEMPLIFICATION

Example 1

This Example describes a flame retardant and heat resistant retroreflective structure made in accordance with the present invention.

An array of retroreflective cube corner elements was attached to an 0.008 inch (about 0.2 mm) plasticized PVC film. A flame retardant, high temperature acrylic pressure sensitive adhesive with a thickness of 0.0035 inches (about 0.089 mm) was applied to the retroreflective cube corner elements. The adhesive used was RA196FR (Syntac Coated Products, LLC; New Hartford, Conn.). FIREGARD® fabric (Spring Industries, Inc.; Fort Mill, S.C.) was laminated to the pressure sensitive adhesive. The fabric was composed of a weave of corespun composite yarn with a glass fiber core and a sheath of cotton and flame retardant modacrylic surrounding and covering the core in both the warp and fill directions of the fabric. The overall blend of the woven fabric was 41% glass fiber, 35% cotton, and 25% modacrylic fiber. The fabric had a weave density of 52 (warp)×36 (fill) threads per inch (per 25.4 mm) in a plain weave configuration and a fabric weight was 4.7 oz/yd$^2$ (about 160 g/m$^2$).

Example 2

This Example describes a retroreflective structure similar to the structure of Example 1 but made with a non-flame retardant and non-high temperature adhesive.

An array of retroreflective cube corner elements was attached to an 8-mil plasticized PVC film. Scapa Unifilm U604X acrylic pressure sensitive adhesive (Scapa North America; Windsor, Conn.) with a thickness of 0.0035 inches (about 0.089 mm) was applied to the retroreflective cube corner elements. As in Example 1, FIREGARD® fabric (Spring Industries, Inc.) was laminated to the pressure sensitive adhesive.

Example 3

This Example describes a retroreflective structure similar to the structure of Example 1 but made using an all cotton woven fabric.

An array of retroreflective cube corner elements was attached to an 0.008 inch (about 0.2 mm) plasticized PVC film. A flame retardant, high temperature acrylic pressure sensitive adhesive, RA196FR (Syntac Coated Products, LLC; New Hartford, Conn.), with a thickness of 0.0035 inches (about 0.089 mm) was applied to the retroreflective cube corner elements. 100% cotton fabric was laminated to the pressure sensitive adhesive. The cotton fabric had a weave density of 80 (warp)×48 (fill) in a twill weave configuration and a fabric weight of 8.7 oz/yd$^2$ (about 290 g/m$^2$)

Example 4

This Example describes testing performed on retroreflective structures that were formed as described in Examples 1-3.

Testing was conducted in accordance with NFPA 1971, Standard on Protective Ensembles for Structural Fire Fighting and Proximity Fire Fighting (2007 Ed.), Flame Resistance Test (§ 8.2) and 260° C. Heat Test (§ 8.6.4.1). Table 1 shows results of flame resistance testing. Table 2 shows results of the 260° C. Heat Test.

TABLE 1

| After Flame (seconds) | Char Length (millimeters) |
|---|---|
| Retroreflective Structure of Example 1 | |
| 0.84 | 7 |
| 1.46 | 7 |
| 1.12 | 8 |
| 1.31 | 11 |
| 1.03 | 9 |
| Retroreflective Structure of Example 2 | |
| 62 | Not Applicable* |
| Retroreflective Structure of Example 3 | |
| 48.84 | 38 |
| 3.84 | 48 |
| 5.40 | 35 |
| 2.34 | 67 |
| 2.87 | 47 |

*The entire retroreflective structure of Example 2 combusted, failing the test.

TABLE 2

| Retroreflective Structure | Pass/Fail | Comments |
| --- | --- | --- |
| Example 1 | PASS | The sample did not melt, drip, ignite, or separate. |
| Example 2 | FAIL | The sample did not melt, drip, or ignite. The sample separated between the adhesive and the prisms. |
| Example 3 | PASS | The sample did not melt, drip, ignite or separate. |

Based on the 260° C. Heat Test (§ 8.6.4.1) and Flame Resistance Test (§ 8.2), the retroreflective structure containing both a corespun composite yarn and a flame retardant, high temperature acrylic adhesive had the best performance, passing both tests. The retroreflective structure made with an all cotton woven fabric, Example 3, had the worst performance, failing both tests.

While this invention has been particularly shown and described with references to preferred embodiments thereof, it will be understood by those skilled in the art that various changes in form and details may be made therein without departing from the scope of the invention encompassed by the appended claims.

What is claimed is:

1. A retroreflective structure, comprising:
   a) a transparent plasticized polyvinyl chloride film;
   b) an array of retroreflective cube-corner elements underlying the transparent plasticized polyvinyl chloride film;
   c) a flame retardant and heat resistant adhesive underlying the array of retroreflective cube-corner elements; and
   d) a flame retardant woven fabric bonded to the flame retardant and heat resistant adhesive,
wherein the flame retardant and heat resistant adhesive (c) contains at least one flame retardant synergist selected from the group consisting of antimony trioxide, antimony pentoxide, sodium antimonite, zinc borate, and combinations thereof.

2. The retroreflective structure of claim 1 wherein the transparent plasticized polyvinyl chloride film has a Shore A hardness of about 30 to about 45.

3. The retroreflective structure of claim 1 wherein the transparent plasticized polyvinyl chloride film has a thickness of about 0.001 to about 0.022 inches (about 0.025 to about 0.56 mm).

4. The retroreflective structure of claim 1 wherein the transparent plasticized polyvinyl chloride film has a thickness of about 0.006 to about 0.018 inches (about 0.15 to about 0.46 mm).

5. The retroreflective structure of claim 1 wherein the transparent plasticized polyvinyl chloride film includes a fluorescent dye.

6. The retroreflective structure of claim 1 wherein the array of retroreflective cube corner elements is coated with a metal.

7. The retroreflective structure of claim 6 wherein the metal is selected from the group consisting of aluminum, silver, gold, and palladium.

8. The retroreflective structure of claim 1 wherein the flame retardant and heat resistant adhesive is selected from the group consisting of silicone adhesives and acrylic adhesives.

9. The retroreflective structure of claim 1 wherein the flame retardant and heat resistant adhesive is a crosslinked acrylic adhesive.

10. The retroreflective structure of claim 1 wherein the flame retardant and heat resistant adhesive contains at least one additive selected from the group consisting of flame retardant chlorinated additives, flame retardant brominated additives, and combinations thereof.

11. The retroreflective structure of claim 1 wherein the flame retardant woven fabric is selected from the group consisting of fiber glass fabrics, flame retardant cotton fabrics, flame retardant modacrylic fabrics, Nomex fabrics, Nomex-Kevlar fabrics, polybenzimidizole fabrics, fabrics which include a corespun composite yarn with a glass fiber core and a sheath of cotton and flame retardant modacrylic fiber, and combinations thereof.

12. The retroreflective structure of claim 1 wherein the woven fabric has a weave density of about 40 to about 70 (Warp)×about 25 to about 45 (Fill) threads per inch (per 25.4 mm).

13. The retroreflective structure of claim 1 wherein the woven fabric has a weave density of about 55 to about 65 (Warp)×about 30 to about 40 (Fill) threads per inch (per 25.4 mm).

14. The retroreflective structure of claim 1 wherein the woven fabric is essentially de-sized of any sizing agents that may have been utilized during weaving.

15. The retroreflective structure of claim 1 wherein the fabric includes a core spun composite yarn with a glass fiber core and a sheath of cotton and flame retardant modacrylic fiber.

16. The retroreflective structure of claim 15 wherein the woven fabric includes about 30 to about 60 weight percent glass fiber.

17. The retroreflective structure of claim 15 wherein the woven fabric includes no more than about 40 weight percent cotton fiber.

18. The retroreflective structure of claim 15 wherein the woven fabric includes about 10 to about 70 weight percent modacrylic fiber.

19. The retroreflective structure of claim 15 wherein the woven fabric includes about 35 to about 45 weight percent glass fiber, about 30 to about 40 weight percent cotton fiber, and about 20 to about 30 weight percent modacrylic fiber.

20. The retroreflective structure of claim 1 further including a polymeric film layer sealed through the array of cube-corner elements to the transparent plasticized polyvinyl chloride film.

21. The retroreflective structure of claim 20 wherein the flame retardant and heat resistant adhesive is bonded to the polymeric film layer and also to the flame retardant woven fabric.

22. The retroreflective structure of claim 1, further including a layer of printing ink overlying the transparent plasticized polyvinyl chloride film.

23. The retroreflective structure of claim 1, further including a layer of printing ink underlying the transparent plasticized polyvinyl chloride film.

24. The retroreflective structure of claim 1, further including a layer of printing ink overlying the array of retroreflective cube-corner elements.

25. A retroreflective structure, comprising:
   a) a transparent plasticized polyvinyl chloride film;
   b) an array of retroreflective cube-corner elements underlying the transparent plasticized polyvinyl chloride film;
   c) a metallized reflective layer deposited on the retroreflective cube-corner elements;
   d) a flame retardant and heat resistant crosslinked acrylic adhesive bonded to the metallized reflective layer; and
   e) a flame retardant woven fabric bonded to the acrylic adhesive, wherein the acrylic adhesive (d) contains at least one flame retardant synergist selected from the group consisting of antimony trioxide, antimony pentoxide, sodium antimonite, zinc borate, and combinations thereof.

26. The retroreflective structure of claim 25 wherein the transparent plasticized polyvinyl chloride film has a Shore A hardness of about 30 to about 45.

27. The retroreflective structure of claim 25 wherein the transparent plasticized polyvinyl chloride film has a thickness of about 0.001 to about 0.022 inches (about 0.025 to about 0.56 mm).

28. The retroreflective structure of claim 25 wherein the transparent plasticized polyvinyl chloride film has a thickness of about 0.006 to about 0.018 inches (about 0.15 to about 0.46 mm).

29. The retroreflective structure of claim 25 wherein the transparent plasticized polyvinyl chloride film includes a fluorescent dye.

30. The retroreflective structure of claim 25 wherein the metallized reflective layer includes at least one metal selected from the group consisting of aluminum, silver, gold, and palladium.

31. The retroreflective structure of claim 25 wherein the metallized reflective layer is an aluminum layer.

32. The retroreflective structure of claim 25 wherein the acrylic adhesive includes at least one additive selected from the group consisting of flame retardant chlorinated additives, brominated additives, and combinations thereof.

33. The retroreflective structure of claim 25 wherein the flame retardant woven fabric is selected from the group consisting of fiber glass fabrics, flame retardant cotton fabrics, flame retardant modacrylic fabrics, Nomex fabrics, Nomex-Kevlar fabrics, polybenzimidizole fabrics, fabrics which include a corespun composite yarn with a glass fiber core and a sheath of cotton and flame retardant modacrylic fiber, and combinations thereof.

34. The retroreflective structure of claim 25 wherein the flame retardant woven fabric includes a corespun composite yarn with a glass fiber core and a sheath of cotton and flame retardant modacrylic fiber.

35. The retroreflective structure of claim 25 wherein the woven fabric has a weave density of about 40 to about 70 (Warp)×about 25 to about 45 (Fill) threads per inch (per 25.4 mm).

36. The retroreflective structure of claim 25 wherein the woven fabric is essentially de-sized of any sizing agents that may have been utilized during weaving.

37. The retroreflective structure of claim 25, further including a layer of printing ink overlying the transparent plasticized polyvinyl chloride film.

38. The retroreflective structure of claim 25, further including a layer of printing ink underlying the transparent plasticized polyvinyl chloride film.

39. The retroreflective structure of claim 25, further including a layer of printing ink overlying the array of retroreflective cube-corner elements.

* * * * *